Nov. 3, 1931.  S. C. KNUDSON  1,830,364
FIREPLACE PROTECTOR
Filed April 29, 1930  2 Sheets-Sheet 1
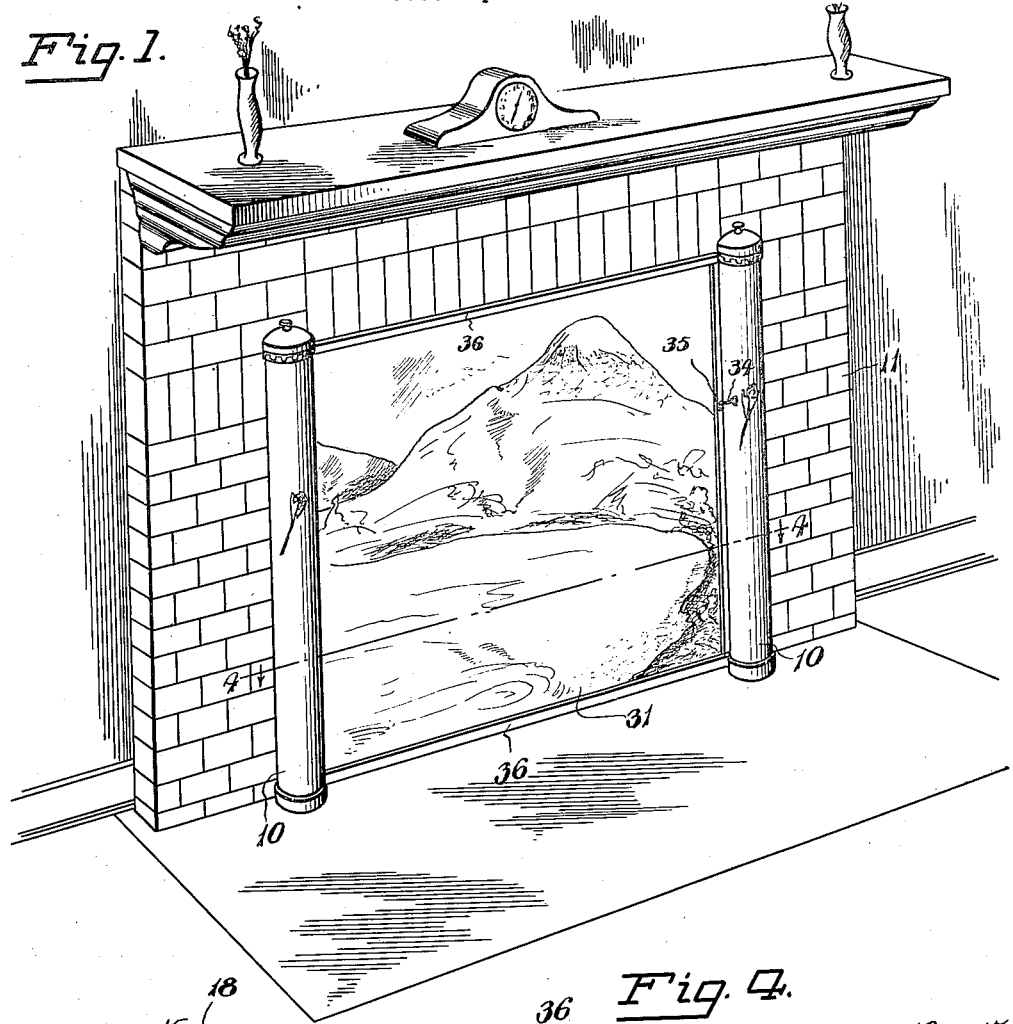
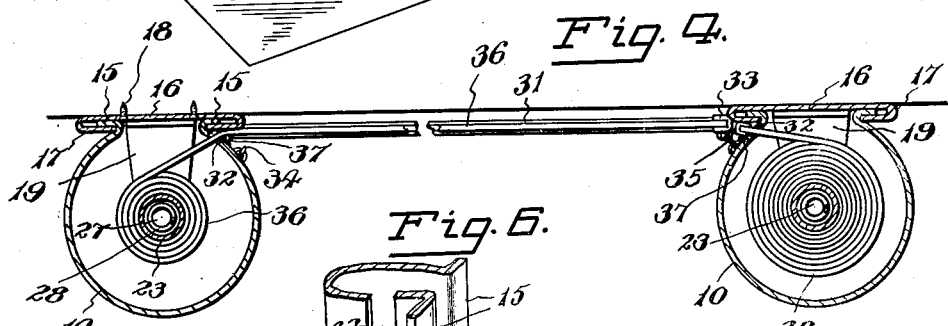
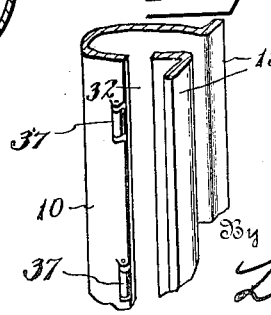
Inventor
S C Knudson
By Lacey & Lacey, Attorney Nov. 3, 1931. S. C. KNUDSON 1,830,364
FIREPLACE PROTECTOR
Filed April 29, 1930 2 Sheets-Sheet 2
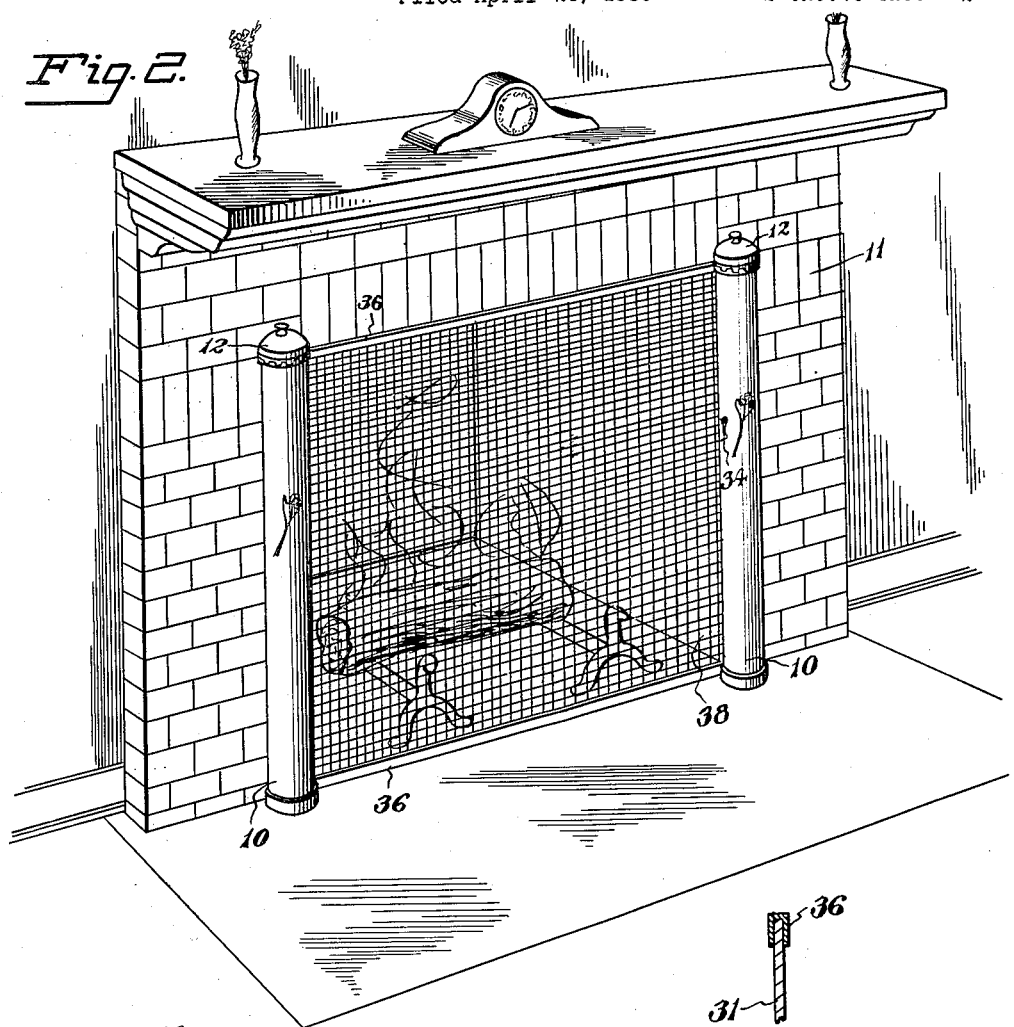
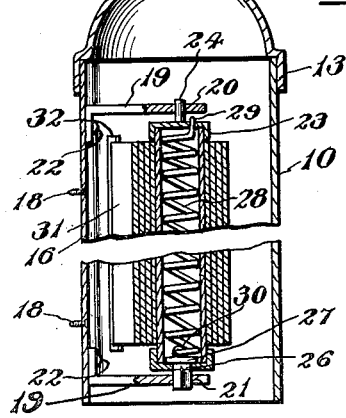
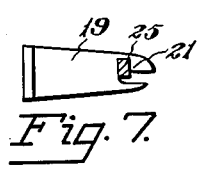
Inventor
S. C. Knudson
By Lacey & Lacey, Attorneys Patented Nov. 3, 1931

1,830,364

UNITED STATES PATENT OFFICE

STEPHEN C. KNUDSON, OF KELLOGG, IDAHO

FIREPLACE PROTECTOR

Application filed April 29, 1930. Serial No. 448,378.

This invention relates to fireplace protectors and has for an object to provide an ornamental shutter and a screen which may be selectively used, the former to conceal the fireplace opening during summer and the latter to prevent the escape of sparks and burning brands from the fireplace in winter.

A further object of the invention is to provide a pair of ornamental cases and a spring controlled roller in each case which carries the shutter or the screen in rolled up condition within the case when not in use.

A still further object is to provide guide bars in combination with the case wherein the edges of the shutter or the screen are confined so that the shutter or the screen will be held against buckling and will present a smooth appearance when in use.

A still further object is to provide a case and shutter or screen which may be easily and quickly installed or removed from the fireplace and may be ornamented to suit the taste of the user whereby to add to the appearance of the fireplace.

A still further object is to provide a case having anti-friction rollers for contact with the shutter or screen so that the same may be easily unrolled or rolled up without injury to the surface of the material thereof.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a perspective view showing a fireplace equipped with a shutter and screen constructed in accordance with my invention, the shutter being shown in operative position to conceal the fireplace opening, Figure 2 is a perspective view similar to Figure 1 but showing the screen in operative position to prevent sparks or burning embers from escape into the room, Figure 3 is a longitudinal sectional view through the shutter case with the shutter in rolled up position therein, Figure 4 is a cross-sectional view taken on the line 4—4 of Figure 1, Figure 5 is a vertical sectional view taken through the shutter and upper and lower guides, Figure 6 is a fragmentary perspective view showing the anti-friction rollers on the case, and Figure 7 is a detail view showing one of the fixtures with the roller tenon therein.

Referring now to the drawings in which like characters of reference designate similar parts in the various views, the preferred embodiment of my invention comprises a pair of upright cylindrical cases 10 which are adapted to be arranged in spaced relationship at the sides of the opening in a fireplace 11. The cases are preferably duplicates of each other so that a description of one will suffice for both.

The case 10 is closed at the top by a removable cap 12, the same having a flange 13 for engagement with the upper edge portion of the case and the flange may be ornamented as desired. The cap is preferably provided with a knob 14 to facilitate removal and application of the cap. It will be here pointed out that both the case and the cap may be formed of any desired material and may be ornamented as desired to harmonize with the room furnishings.

The case 10 is preferably open at the back and the edges of said opening are directed laterally to form flanges 15 as best shown in Figure 4. A back plate 16 of substantially the same length as the case is turned over at the longitudinal edges to provide hooks or channels 17 which receive the flanges 15 of the case. The back plate is preferably secured to the fireplace structure by screws 18 or similar fastening devices and rigidly supports the case 10 in an upright position at the edge of the fireplace opening.

By now referring to Figure 3 it will be seen that secured to the back plate are spaced fixtures 19 which are somewhat similar to window shade roller fixtures of the usual wellknown type, one of the fixtures being provided with a circular opening 20 therein and the other being provided with a substantially oblong off-set opening 21 therein, as best shown in Figure 7. These fixtures are preferably riveted to the back plate as shown at 22.

A hollow roller 23 is arranged axially in the case, one end of the roller being equipped with a cylindrical trunnion 24 which is journaled in the circular opening 20. The opposite end of the roller is provided with a flat tenon 25 which engages in the oblong opening 21. The tenon is provided with a cylindrical neck 26 which is rotatably mounted in the end of the roller and terminates in a disc head 27. A helical spring 28 is mounted within the hollow bore of the roller, one end 29 of the spring being passed through an opening formed in the end wall of the roller and the opposite end being preferably secured to an eye 30 formed integral with the head 27 of the tenon 21.

A shutter 31 is secured at one end edge of the roller 23 by means of nails, screws, or other similar fasteners and is normally rolled up on the roller when not in use. A slot 32 is formed in the case and the free end of the shutter 31 is passed outwardly through this slot and is preferably provided with a U-shaped binding strip 33. The binding strip is of slightly greater cross diameter than the width of the slot so that the binding strip will engage against the case and limit movement of the shutter when being rolled on the roller as will be understood.

The shutter may be constructed of flexible "glass" (so-called) as used for automobile curtains and the like, or may be formed of sheet copper, steel, tin, aluminum, or other suitable material. Preferably the shutter is finished by plating, burnishing, or hammering, or may be provided with raised scroll work figures or with painted ornamentation to suit the taste of the user.

It will be noted by referring to Figure 1 that the shutter above described may be pulled outwardly during warm weather to conceal the fireplace opening and when in this position is preferably held secured by means of a hook 34 attached to the opposite case 10 which contains the screen as will be presently described, there being an eye 35 disposed on the shutter to receive the hook. When it is desired to remove the shutter in order to use the fireplace it is simply necessary to unhook the hook 34 whereupon the tension of the spring 28 will operate to roll the shutter 31 upon the roller much in the same manner that a window shade is rolled upon its roller.

In order to hold the shutter against bulging or buckling and to guide the same truly during its movement from open to closed position and vice versa, a pair of guide bars 36 are arranged in parallel spaced relationship above and below the fireplace opening and are secured to the fireplace structure in any preferred manner. These guide bars are preferably grooved to receive the longitudinal edges of the shutter.

By referring now to Figure 6 it will be seen that anti-friction rollers 37 are arranged on the case 10 and support the shutter during its movement to open or closed position. The anti-friction rollers obviously permit of easy movement of the shutter while at the same time prevent defacement of the shutter while being rolled or unrolled.

By now referring more especially to Figure 2 it will be seen that while one of the cases 10 is equipped with a shutter to conceal the fireplace, the opposite case is equipped with a screen 38. The screen may be formed of any desired material and is substantially of the same width and length as the above described shutter whereby to be received in the guide bars 36 when unrolled from the roller and hooked in place on the opposite case as above described to mask the fireplace opening and prevent sparks and burning embers from escape into the room.

Having thus described the invention, I claim:

1. A fireplace attachment comprising a pair of upright cases adapted to be arranged on opposite sides of a fireplace and form ornamental posts, a flexible member rolled upon itself in one of said cases and adapted to be withdrawn therefrom to extend across the fireplace opening to the other case, means on said other case for securing the longitudinal edge of said flexible member to maintain said member taut, and means for automatically rolling said member upon itself upon disengagement of said securing means.

2. A fireplace attachment comprising a pair of upright cases adapted to be arranged on opposite sides of a fireplace and forming ornamental posts, a flexible member movable into and out of one of said cases and adapted to mask said fireplace when withdrawn from said case; horizontally disposed guide bars bridging the space between the cases and being adapted to engage the upper and lower longitudinal edges of said member, both of said cases having openings in the backs thereof, the longitudinal edges of each opening being directed outwardly to form flanges, and means for securing the cases to the fireplace including back plates having longitudinal channels removably receiving said flanges.

3. A fireplace attachment comprising a pair of upright cases adapted to be arranged on opposite sides of a fireplace and forming ornamental posts, a hollow roller disposed axially in one of said cases, a helical spring disposed in the bore of said roller, fixtures carried by said case and rotatably mounting said roller, a flexible member secured at one end to said roller and normally held rolled thereon by said spring, the end of said member projecting through a longitudinal slot formed in said case, upper and lower horizontal guide bars adapted to be secured to the fireplace to bridge the space between both of said cases, said guide bars engaging the longitudinal edges of said flexible member when said member is unrolled from said roller, and means on the other of said cases for holding said flexible member taut in said guide bars against the tension of said spring.

4. A fireplace attachment comprising a pair of upright cases adapted to be arranged on opposite sides of a fireplace and forming ornamental posts, a cap closing the top of one of said cases, there being a longitudinal slot formed in one side of said case below the cap, a back plate adapted to be attached to the fireplace and removably secured to the longitudinal edges of said slot in the back of said case, a flexible member rolled upon itself within said case and projecting through said longitudinal slot, anti-friction rollers disposed on one edge portion of said slot and engaging said flexible member, and hooks and eyes operatively connected to the free edge of said flexible member and to the other of said posts for holding said flexible member taut across the fireplace in operative position.

5. A fireplace attachment comprising a pair of upright cases adapted to be arranged on opposite sides of a fireplace and forming ornamental posts, upper and lower horizontal guide bars adapted to be attached to the fireplace and bridge the space between said posts, a flexible member rolled upon itself in one case and adapted to be withdrawn between and in engagement with said guide bars until the free edge meets the other of said posts, and coacting means on the free edge of said flexible member and on said other post for holding said flexible member taut across said fireplace, said guide bars confining said flexible member against bulging when in unrolled condition.

In testimony whereof I affix my signature.

STEPHEN C. KNUDSON. [L. S.]